(12) United States Patent
Kim et al.

(10) Patent No.: US 10,705,406 B2
(45) Date of Patent: Jul. 7, 2020

(54) TWO-DIMENSIONAL LIGHT MODULATING DEVICE AND ELECTRONIC APPARATUS INCLUDING THE SAME

(71) Applicant: SAMSUNG ELECTRONICS CO., LTD., Suwon-si (KR)

(72) Inventors: Sunil Kim, Osan-si (KR); Jungwoo Kim, Hwaseong-si (KR); Duhyun Lee, Yongin-si (KR); Changgyun Shin, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 15/815,188

(22) Filed: Nov. 16, 2017

(65) Prior Publication Data
US 2018/0136537 A1    May 17, 2018

(30) Foreign Application Priority Data

Nov. 16, 2016   (KR) ................. 10-2016-0152967

(51) Int. Cl.
*G02F 1/29* (2006.01)
*G01S 7/481* (2006.01)

(52) U.S. Cl.
CPC ............ *G02F 1/292* (2013.01); *G01S 7/4817* (2013.01); *G02F 2202/20* (2013.01); *G02F 2202/30* (2013.01)

(58) Field of Classification Search
CPC .... G01S 7/4817; G02F 1/292; G02F 2202/20; G02F 2202/30
USPC ...................................................... 356/5.01
See application file for complete search history.

(56) References Cited

U.S. PATENT DOCUMENTS

| 7,068,234 B2 | 6/2006 | Sievenpiper |
| 7,683,854 B2 | 3/2010 | Sievenpiper et al. |
| 9,335,548 B1 | 5/2016 | Cakmakci et al. |
| 2008/0128508 A1* | 6/2008 | Tsikos ................ G06K 7/10732 235/462.42 |
| 2016/0087342 A1 | 3/2016 | Alu et al. |

(Continued)

FOREIGN PATENT DOCUMENTS

| EP | 3 293 569 A1 | 3/2018 |
| KR | 10-2009-0047949 A | 5/2009 |
| WO | 2015/187221 A2 | 12/2015 |

OTHER PUBLICATIONS

Mikhail I. Shalaev et al., High-Efficiency All-Dielectric Metasurfaces for Ultracompact Beam Manipulation in Transmission Mode, Nano Letters, vol. 15, No. 9, American Chemical Society, XP055363538, Sep. 9, 2015, pp. 6261-6266.

(Continued)

*Primary Examiner* — Daniel L Murphy
(74) *Attorney, Agent, or Firm* — Sughrue Mion, PLLC (57) ABSTRACT

A two-dimensional (2D) light modulating device may include a plurality of phase modulating elements and a circuit board. The plurality of phase modulating elements may include a meta surface having a nano-structure. The circuit board may be configured to independently control electrical signals that are respectively transmitted to the plurality of phase modulating elements. The circuit board may include a plurality of pixel circuit units. Each of the plurality of pixel circuit units may include a transistor and a capacitor.

19 Claims, 10 Drawing Sheets

(56) References Cited

U.S. PATENT DOCUMENTS

2016/0223723 A1 8/2016 Han et al.
2016/0243646 A1 8/2016 Kleinert et al.

OTHER PUBLICATIONS

Huanhuan Yang et al., "A Programmable metasurface with dynamic polarization, scattering and focusing control", Scientific Reports, vol. 6, No. 1, XP055462917, Oct. 24, 2016, pp. 1-11.
Yao-Wei Huang et al., "Gate-Tunable Conducting Oxide Metasurfaces", Nano Letters, vol. 16, No. 9, American Chemical Society, XP55462905, Sep. 2, 2016, pp. 5319-5325.
Communication dated Apr. 6, 2018, issued by the European Patent Office in counterpart European Application No. 17196450.5.

* cited by examiner

TWO-DIMENSIONAL LIGHT MODULATING DEVICE AND ELECTRONIC APPARATUS INCLUDING THE SAME

CROSS-REFERENCE TO RELATED APPLICATION

This application claims priority from Korean Patent Application No. 10-2016-0152967, filed on Nov. 16, 2016, in the Korean Intellectual Property Office, the disclosure of which is incorporated herein in its entirety by reference.

BACKGROUND

1. Field

The present disclosure relates to a light modulating device for modulating incident light.

2. Description of the Related Art

An optical device for changing transmission/reflection, polarization, phase, strength, path, etc., of incident light is used in various optical apparatuses. To control the aforementioned characteristics in a desired manner in an optical system, optical modulators having various structures have been proposed.

For example, a liquid crystal having optical anisotropy, a microelectromechanical system (MEMS) structure using fine mechanical movement of a light blocking/reflecting element and the like have been widely used for general optical modulators. Such optical modulators have a slow operation response time of several microseconds or more due to characteristics of a driving mechanism thereof.

Recently, there has been an attempt to apply a meta structure to an optical modulator. The meta structure is a structure whose thickness, pattern, period, or the like is less than a wavelength of incident light. To modulate light in a desired shape, phase profiles of various patterns need to be produced.

SUMMARY

Provided is a light modulating device for modulating light in various shapes by producing a desired phase profile.

Additional aspects will be set forth in part in the description which follows and, in part, will be apparent from the description, or may be learned by practice of exemplary embodiments.

According to an aspect of an exemplary embodiment, a two-dimensional (2D) light modulating device may include: a plurality of phase modulating elements including a meta surface having a nano-structure; and a circuit board configured to independently control electrical signals that are respectively transmitted to the plurality of phase modulating elements, and including a plurality of pixel circuit units. Each of the plurality of pixel circuit units may include a transistor and a capacitor.

Each of the plurality of phase modulating elements may include: a metal layer that is electrically connected to a corresponding pixel circuit unit among the plurality of pixel circuit units; an active layer disposed on the metal layer, the active layer having a refractive index that changes based on an electrical signal transmitted from the corresponding pixel circuit unit; a conductive nano-antenna disposed on the active layer; and a first insulating layer disposed between the active layer and the conductive nano-antenna.

The active layer may include a carrier-variable region where a concentration of carriers changes based on an applied voltage.

The active layer may include at least one of transparent conductive oxide, transition metal nitride, lithium niobate (LiNbO$_3$), lithium tantalate (LiTaO$_3$), potassium tantalate niobate (KTN), lead zirconate titanate (PZT), and a polymer material having an electro-optic property.

At least some of the conductive nano-antennas of the plurality of phase modulating elements may be electrically connected to each other, and a uniform electric potential may be applied to the at least some of the conductive nano-antennas.

The carrier-variable region in the active layer may be adjacent to the first insulating layer.

The 2D light modulating device may further include a second insulating layer disposed between the metal layer and the active layer.

The active layers of the plurality of phase modulating elements may be electrically connected to each other, and a uniform electric potential may be applied to the active layers.

The carrier-variable region may be adjacent to the second insulating layer in the active layer.

Each of the plurality of phase modulating elements may include: a dielectric nano-antenna; a metal layer that is separated from the dielectric nano-antenna and electrically connected to a corresponding pixel circuit unit among the plurality of pixel circuit units; an active layer disposed on the metal layer, the active layer having a refractive index varying according to an electrical signal from the corresponding pixel circuit unit; and a transparent conductive layer disposed on the active layer.

The refractive index of the active layer may be less than a refractive index of the dielectric nano-antenna.

The dielectric nano-antenna may include a material having a dielectric constant that is equal to or greater than 10.

The transparent conductive layers of the plurality of phase modulating elements may be electrically connected to each other, and a uniform electric potential may be applied to the transparent conductive layers.

The active layer, the transparent conductive layer, and the dielectric nano-antenna may be sequentially arranged above the metal layer.

The 2D light modulating device may further include a spacer layer between the metal layer and the active layer, the spacer layer including a dielectric material.

The dielectric nano-antenna, the active layer, and the transparent conductive layer may be sequentially arranged above the metal layer.

The active layer and the transparent conductive layer may have the same shape as the dielectric nano-antenna when viewed from a plan view.

The 2D light modulating device may further include a spacer layer between the metal layer and the dielectric nano-antenna, the spacer layer including a dielectric material.

The nano-structure may have one of a circular shape, an oval shape, a polygonal shape, a cross shape, a star shape, and a shape in which two or more of the circular shape, the oval shape, the polygonal shape, the cross shape, and the star shape are combined.

According to an aspect of an exemplary embodiment, a lidar device may include: a light source unit; a 2D light modulating device configured to steer light irradiated from the light source unit toward an object, wherein the 2D light modulating device includes a plurality of phase modulating elements including a meta surface having a nano-structure, and a circuit board independently controlling electrical signals that are respectively transmitted to the plurality of phase modulating elements, the circuit board including a plurality of pixel circuit units, and each of the plurality of pixel circuit unites including a transistor and a capacitor; and a sensor configured to receive the light, steered by the 2D light modulating device and irradiated onto the object, is reflected from the object.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Reference will now be made in detail to various exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. The word "exemplary" is used herein to mean "serving as an example or illustration." Any aspect or design described herein as "exemplary" is not necessarily to be construed as preferred or advantageous over other aspects or designs.

The present disclosure will now be described more fully with reference to the accompanying drawings, in which exemplary embodiments of the present disclosure are shown. Like reference numerals in the drawings denote like elements, and sizes and thicknesses of components in the drawings are arbitrarily illustrated for convenience of explanation. The present disclosure may be embodied in many different forms and should not be construed as being limited to the exemplary embodiments set forth herein.

It will be understood that when a component, such as a layer, a film, a region, or a plate, is referred to as being "on" another component, the component can be directly on the other component or intervening components may be present therebetween.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well and vice versa, unless the context clearly indicates otherwise.

Also, the terms "unit," "module," "elements," etc. are units for processing at least one function or operation and may be implemented as hardware, software, or a combination of hardware and software.

Figure 1:
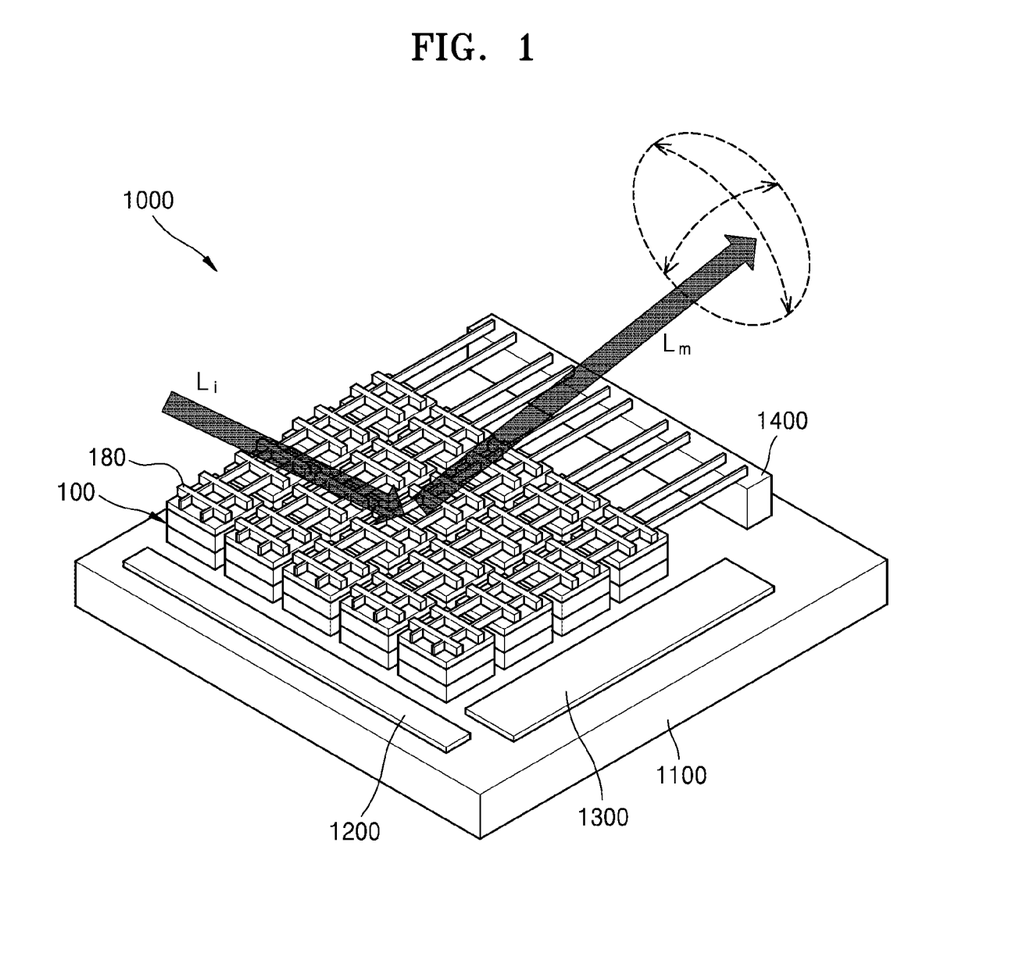
FIG. 1 is a perspective view schematically illustrating a two-dimensional (2D) light modulating device according to an exemplary embodiment.
Figure 2:
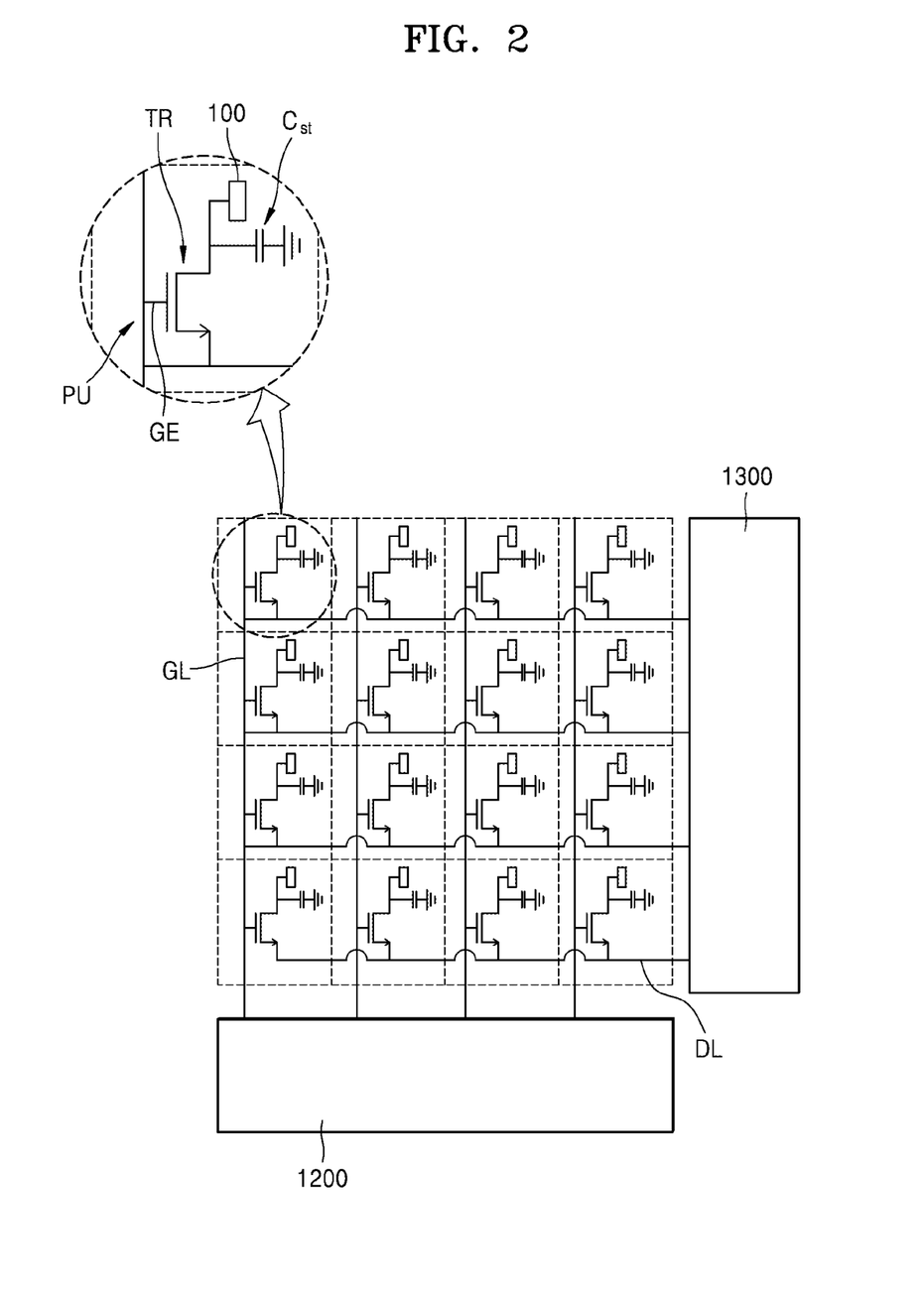
FIG. 2 is a circuit diagram illustrating a circuit structure of the 2D light modulating device of FIG. 1.

FIG. 1 is a perspective view schematically illustrating a two-dimensional (2D) light modulating device 1000 according to an exemplary embodiment. FIG. 2 is a circuit diagram illustrating a circuit structure of the 2D light modulating device 1000 of FIG. 1.

The 2D light modulating device 1000 includes phase modulating elements 100 that have meta surfaces including conductive nano-antennas 180 and are independently controlled. The meta surface is a surface including nano-structures (e.g., nano-antennas), whose dimensions are smaller than wavelengths of incident light $L_i$ in order to modulate the incident light $L_i$. The incident light $L_i$ is modulated to certain modulated light $L_m$ on the meta surface, and a circuit structure for independently controlling each phase modulating element 100 is employed to diversify a shape of the modulated light $L_m$.

The phase modulating elements 100 may be two-dimensionally arranged on a circuit board 1100. The circuit board 1100 includes pixel circuit units PU for independently controlling electrical signals that are respectively transmitted to the phase modulating elements 100. Some or all of the conductive nano-antennas 180 included in the phase modulating elements 100 may be electrically connected to each other such that a uniform electric potential may be applied to the conductive nano-antennas 180. For example, as shown in the drawings, the conductive nano-antennas 180 may be connected in a row-wise direction to the same ground connection portion 1400. In other examples, the conductive nano-antennas 180 may be connected in a column-wise direction. In still other examples, the conductive nano-antennas 180 may be connected in both row-wise and column-wise directions in a grid. In an exemplary embodiment, each of the phase modulating elements 100 is a hardware component as described above.

As shown in FIG. 2, the pixel circuit units PU are two-dimensionally arranged and each include a transistor TR and a capacitor $C_{st}$.

In more detail, gate lines GL extending in one direction may be apart from each other at certain intervals and may cross data lines DL. The transistors TR and the capacitors $C_{st}$ are placed in areas where the gate lines GL cross the data lines DL, thus forming the pixel circuit units PU. The pixel circuit units PU are electrically connected to the phase modulating elements 100.

Also, a gate controller 1200 that is connected to the gate lines GL and transmits gate signals to the transistors TR may be included. In addition, a pixel charge controller 1300 connected to the data lines DL may be included and may transmit electrical signals for charging the capacitors $C_{st}$ to the capacitors $C_{st}$ through the transistors TR.

When a gate voltage is applied as the gate signals from the gate controller 1200 reach a gate electrode GE of the transistor TR via the gate lines GL, a channel is formed between a source electrode and a drain electrode of the transistor TR. When the charge signals from the pixel charge controller 1300 reach the capacitor $C_{st}$ via the data lines DL and the channel, the capacitor $C_{st}$ is charged. In this case, the gate controller 1200 and the pixel charge controller 1300 may respectively transmit the gate signals and the charge signals in such a manner that different charges are charged to the capacitor $C_{st}$ in each pixel circuit unit PU. The charges may produce a desired phase profile in the entire 2D light modulating device 1000 as phase modulation is differently performed by the phase modulating elements 100 and thus generate desired modulated light $L_m$.

Figure 3:
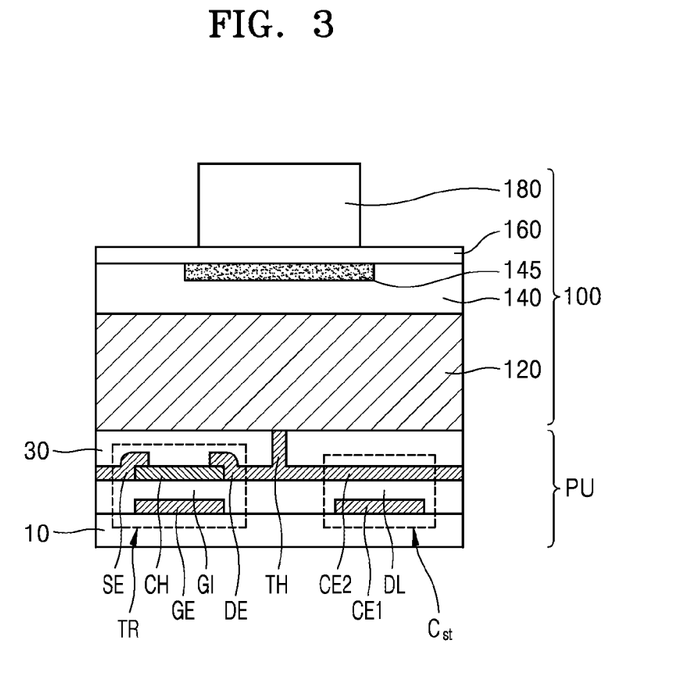
FIG. 3 is a cross-sectional view of an example of a pixel circuit unit and a phase modulating device of the 2D light modulating device of FIG. 1, the phase modulating device being connected to the pixel circuit unit.

FIG. 3 is a cross-sectional view of an example of the pixel circuit unit PU and the phase modulating element 100 of the 2D light modulating device 1000 of FIG. 1, the phase modulating element 100 being connected to the pixel circuit unit PU.

The pixel circuit unit PU includes the transistor TR and the capacitor $C_{st}$ formed on a substrate 10. The pixel circuit unit PU may further include a passivation layer 30 covering the transistor TR and the capacitor $C_{st}$. The transistor TR may include the gate electrode GE, a gate insulating layer GI, a channel layer CH, a source electrode SE, and a drain electrode DE. The capacitor $C_{st}$ may include a first electrode CE1, a dielectric layer DL, and a second electrode CE2. The gate insulating layer GI and the dielectric layer DL may include the same material.

The drain electrode DE of the transistor TR and the second electrode CE2 of the capacitor $C_{st}$ may be connected to each other and may be electrically connected to the phase modulating element 100 through a conductive through hole TH penetrating the passivation layer 30.

Data lines connected to the source electrode SE and gate lines connected to the gate electrode GE may be further formed on the substrate 10.

The pixel circuit unit PU shown in FIG. 3 includes one transistor TR and one capacitor $C_{st}$, and the phase modulating element 100 is electrically connected to the capacitor $C_{st}$. However, structures of the pixel circuit unit PU and the phase modulating element 100 are not limited thereto and may vary within a scope that satisfies the above conditions.

The phase modulating element 100 includes a metal layer 120 electrically connected to the pixel circuit unit PU, an active layer 140 disposed on the metal layer 120 and having a refractive index that varies according to an electrical signal from the pixel circuit unit PU, the conductive nano-antenna 180 above the active layer 140, and a first insulating layer 160 between the active layer 140 and the conductive nano-antenna 180.

The conductive nano-antenna 180 may have a subwavelength structure. "Subwavelength" refers to a characteristic of having one or more dimensions that are smaller than the wavelength of light. Thus, any one of the dimensions of the structure of the conductive nano-antenna 180 may be smaller than the wavelength of light to be modulated by the 2D light modulating device 1000. The conductive nano-antenna may interact strongly with light in a certain wavelength band.

The operations of the conductive nano-antenna 180 are based on surface plasmon resonance occurring on a boundary between a conductive material and a dielectric material, and a resonance wavelength may differ depending on the exact shape of the conductive nano-antenna 180.

As shown in FIG. 1, the conductive nano-antenna 180 may have a shape in which two crosses are connected to each other, but its shape is not limited thereto.

The conductive material included in the conductive nano-antenna 180 may be a high-conductivity metallic material in which surface plasmon excitation occurs. For example, at least one selected from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au) may be adopted, or an alloy including any one of the above-listed materials may be adopted. A 2D material having superior conductivity (e.g., graphene) or a conductive oxide may be used.

The first insulating layer 160 may include various insulating materials, for example, silicon nitride (SiNx), silicon oxide (SiOx), aluminum oxide ($Al_2O_3$), hafnium oxide ($HfO_2$), or the like.

The active layer 140 may include a material having optical properties that change according to an external signal. The external signal may be an electrical signal. The active layer 140 may include transparent conductive oxide (TCO) such as indium tin oxide (ITO), indium zinc oxide (IZO), aluminum zinc oxide (AZO), or gallium zinc oxide (GZO). Also, the active layer 140 may include transition metal nitride such as titanium nitride (TiN), zirconium nitride (ZrN), hafnium nitride (HfN), or tantalum nitride (TaN). In addition, the active layer 140 may include an electro-optic material having effective permittivity that changes according to transmission of an electrical signal, that is, lithium niobate (LiNbO3), lithium tantalate (LiTaO3), potassium tantalate niobate (KTN), lead zirconate titanate (PZT), etc., and may include various polymer materials having electro-optic properties.

The metal layer 120 may be connected to the capacitor $C_{st}$ of the pixel circuit unit PU through the conductive through hole TH. The metal layer 120 may apply a voltage between the metal layer 120 and the conductive nano-antenna 180 according to a signal from the pixel circuit unit PU and may function as a mirror layer that reflects light. The metal layer 120 may include at least one selected from among various metallic materials, for example, Cu, Al, Ni, Fe, Co, Zn, Ti, Ru, Rh, Pd, Pt, Ag, Os, Ir, and Au, which may be used to perform the above function.

The active layer 140 may include a carrier-variable region 145 where a concentration of charge carriers varies depending on whether a voltage is applied between the conductive nano-antenna 180 and the metal layer 120. The carrier-variable region 145 where the concentration of the charge carriers varies may be formed in a portion of the active layer 140 that is adjacent to the first insulating layer 160, that is, in a portion of the active layer 140 that is adjacent to a boundary between the first insulating layer 160 and the active layer 140. The concentration of the carrier-variable region 145 varies according to an applied voltage. The varying concentration changes permittivity of the active layer 140, more particularly, permittivity characteristics with regard to a wavelength, and thus a modulated shape of light that is incident to the phase modulating element 100 may be adjusted.

The permittivity of the active layer 140 has a value that varies with a wavelength. Relative permittivity $\varepsilon_r$ with respect to permittivity $\varepsilon_0$ of vacuum is referred to as a dielectric constant, represented as a complex number, and a real part of a dielectric constant of the active layer 140 indicates 0 in a certain wavelength band. A wavelength band in which a real part of a dielectric constant has a value that is equal to or very close to 0 is referred to as an epsilon near zero (ENZ) wavelength band. Dielectric constants of most materials are presented as functions of wavelengths or may be presented as complex numbers. A dielectric constant of vacuum equals 1. In the case of a general dielectric material, a real part of a dielectric constant is a positive number greater than 1. In the case of a metal, a real part of a dielectric constant may be a negative number. In most wavelength bands, dielectric constants of most materials are greater than 1, but in a certain wavelength band, real parts of the dielectric constants may be 0.

When a real part of a dielectric constant has a value that is equal to or very close to 0, the active layer 140 may exhibit unique optical properties, and an operation wavelength band of each phase modulating element 100 employed in the 2D light modulating device 1000 according to an aspect of an exemplary embodiment may be a region including the ENZ wavelength band of the active layer 140. That is, by setting a resonance wavelength band of the conductive nano-antenna 180 to be similar to the ENZ wavelength band of the active layer 140, a range in which an optical modulation capability is adjusted according to an applied voltage may increase.

The ENZ wavelength band of the active layer 140 may differ depending on the concentration of the carriers in the carrier-variable region 145. In order to use the ENZ wavelength band of the active layer 140, electrical signals transmitted to the phase modulating element 100 may be controlled by the pixel circuit unit PU in such a manner that the resonance wavelength band of the conductive nano-antenna 180 is to be similar to or identical to a wavelength band indicating ENZ properties of the active layer 140.

The phase modulating element 100 includes the conductive nano-antenna 180 and the metal layer 120 functioning as a mirror, and the metal layer 120 interacting with the conductive nano-antenna 180 may form a resonance mode that amplifies the ENZ properties of the carrier-variable region 145.

Figure 4:
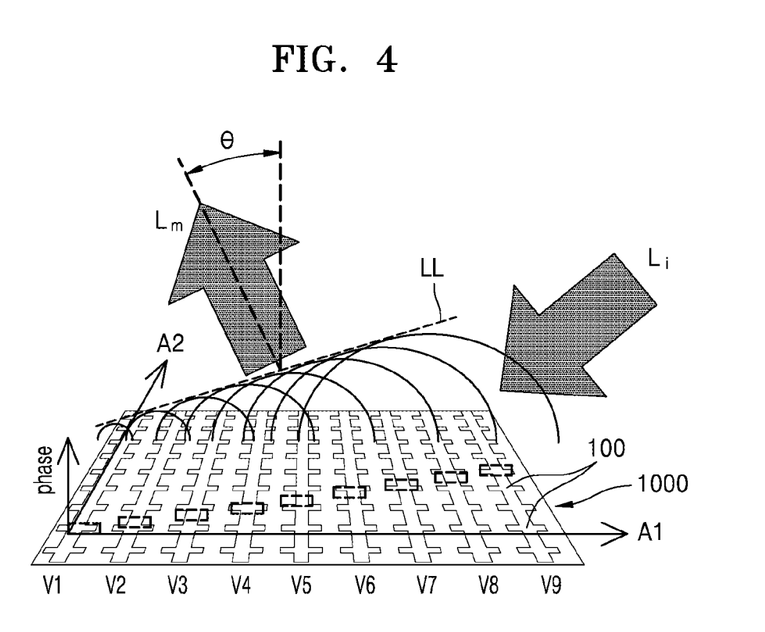
FIG. 4 is a conceptual view for explaining a principle of implementing 2D beam steering by the 2D light modulating device of FIG. 1.

FIG. 4 is a conceptual view for explaining a principle of implementing 2D beam steering by the 2D light modulating device 1000 of FIG. 1.

As described above, each phase modulating element 100 included in the 2D light modulating device 1000 may differently modulate a phase of the incident light $L_i$, depending on transmitted electrical signals. The modulated light $L_m$ modulated by the 2D light modulating device 1000 may be perpendicular to a trend line LL that connects phase values of adjacent phase modulating elements 100.

When a phase change trend of the adjacent phase modulating elements 100 is linear, a difference between adjacent phases is $\Delta\varphi$, and a distance between the adjacent phase modulating elements 100 is d, incident light $L_i$ having a wavelength $\lambda$ is steered in a direction of an angle $\theta$ defined as follows.

$$\sin\theta = \frac{\Delta\phi}{2\pi}\frac{\lambda}{d}$$

According to the above condition, a voltage applied to each phase modulating element 100 is set to form a desired phase change trend.

According to an aspect of an exemplary embodiment, voltages respectively applied to the phase modulating elements 100 may be individually controlled.

As shown in FIG. 4, the phase modulating elements 100, to which voltages V1 through V9 are applied, are indicated by dashed boxes. The phase modulating elements 100 may be selected as angles of the phase modulating elements 100 in a first direction A1 and a second direction A2 are adjusted. That is, since the angles formed by the trend line LL and the first direction A1 and by the trend line LL and the second direction A2 may be adjusted, a direction in which the modulated light $L_m$, which is produced by steering the incident light $L_i$, may be two-dimensionally adjusted.

The conductive nano-antenna 180 of FIG. 1 has the shape in which two crosses are connected, but the shape is not limited thereto.

FIGS. 5A to 5D are exemplary shapes of the conductive nano-antenna 180 adaptable in the 2D light modulating device 1000 of FIG. 1.

Figure 5A:
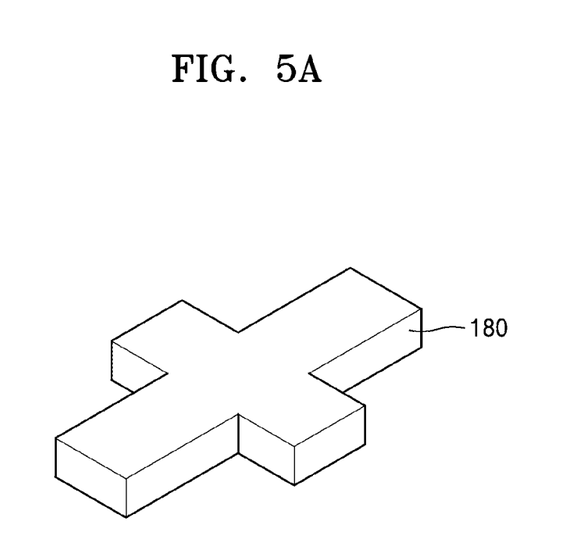
FIGS. 5A to 5D are exemplary shapes of a nano-antenna adaptable in the 2D light modulating device of FIG. 1.

As shown in FIG. 5A, the conductive nano-antenna 180 may have a cross shape, and lengths in two directions forming the cross shape may be the same or may differ.

Figure 5B:
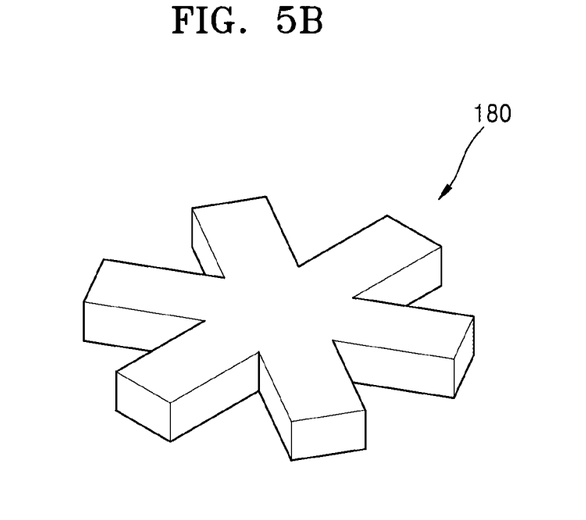

As shown in FIG. 5B, the conductive nano-antenna 180 may have a star shape in which multiple bars cross one another.

Figure 5C:
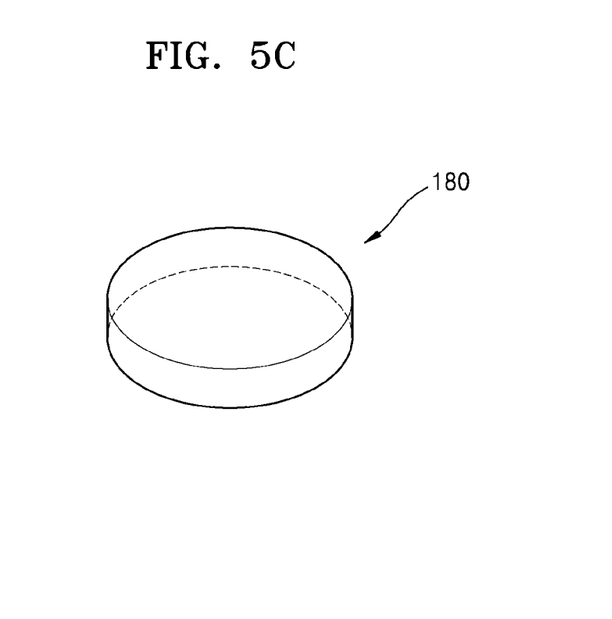

As shown in FIG. 5C, the conductive nano-antenna 180 may have a cylindrical shape. Alternately, the conductive nano-antenna 180 may have a polyprism shape.

Figure 5D:
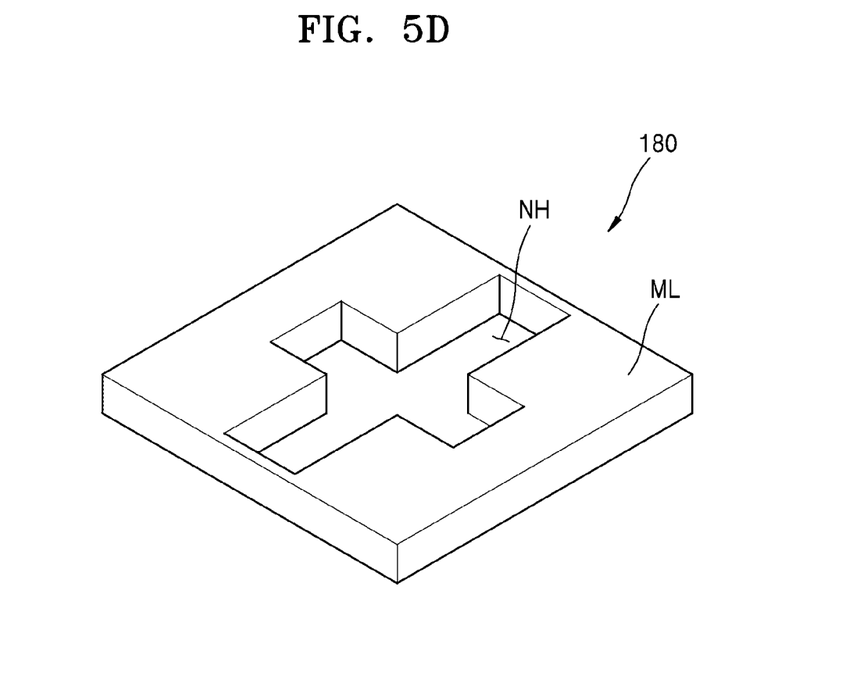

As shown in FIG. 5D, the conductive nano-antenna 180 may have a shape in which a nano hole NH having a cross shape is formed in a metal material layer ML. FIG. 5D shows a reverse shape of FIG. 5A. However, the present disclosure is not limited thereto. A reverse shape of FIG. 5B or 5C is also possible.

The conductive nano-antenna 180 may have a shape in which two or more of the above shapes are combined.

Figure 6:
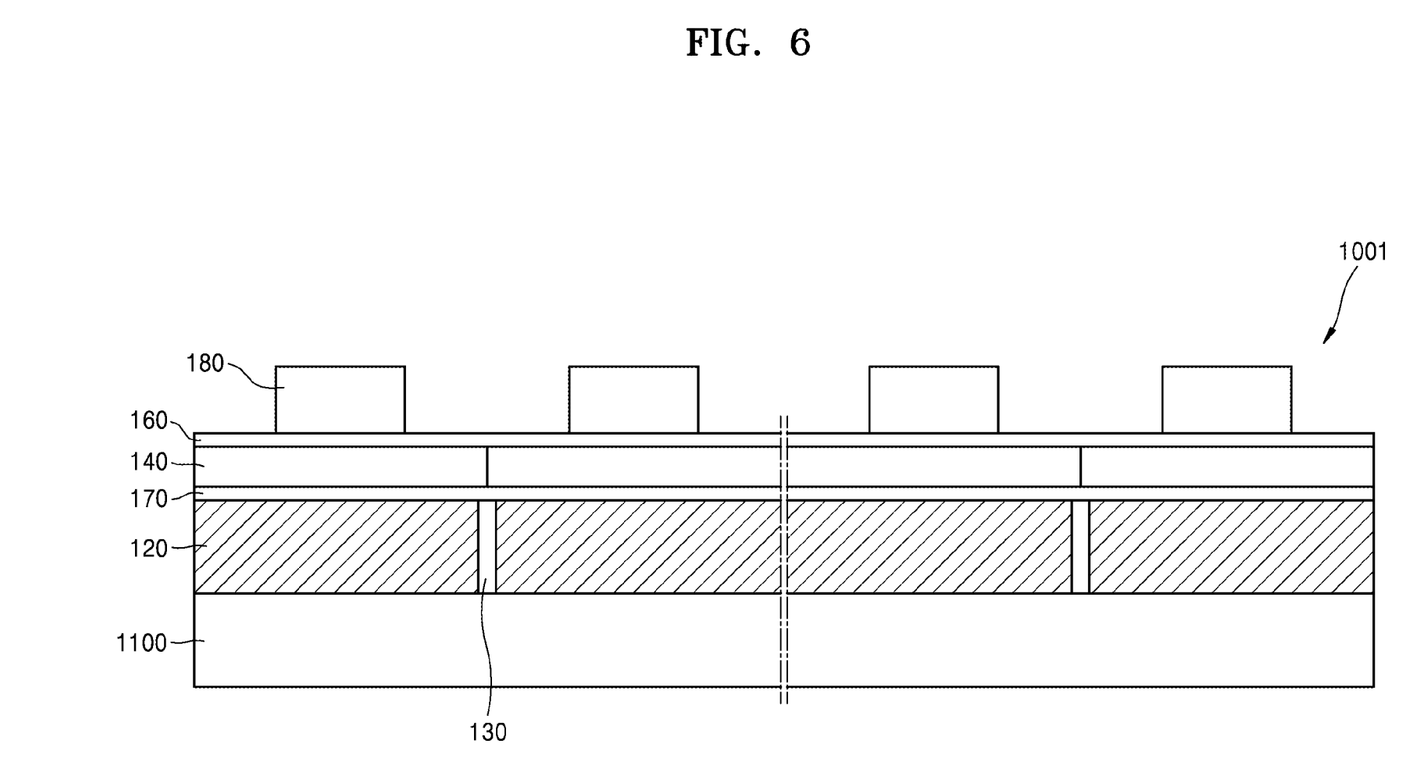
FIG. 6 is a cross-sectional view illustrating a schematic structure of a 2D light modulating device according to an exemplary embodiment.
Figure 7:
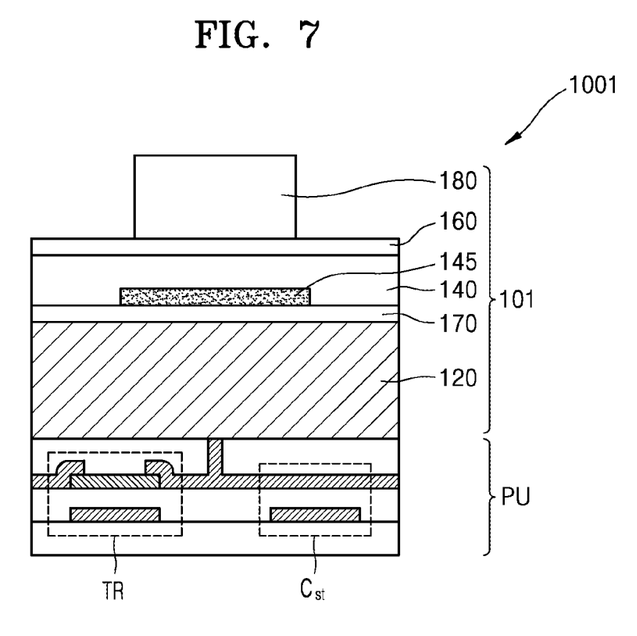
FIG. 7 is a cross-sectional view illustrating a unit structure of the 2D light modulating device of FIG. 6.

FIG. 6 is a cross-sectional view illustrating a schematic structure of a 2D light modulating device 1001 according to an exemplary embodiment, and FIG. 7 is a cross-sectional view illustrating a unit structure of the 2D light modulating device 1001 of FIG. 6.

As shown in FIG. 6, unlike the 2D light modulating device 1000 of FIG. 1, active layers 140 of respective phase modulating elements 101 are connected to each other in the 2D light modulating device 1001.

On the circuit board 1100, metal layers 120 are separated from each other by partitions 130, and above the metal layers 120, a second insulating layer 170, the active layers 140, the first insulating layer 160, and the conductive nano-antennas 180 may be sequentially arranged.

Unlike the description of FIG. 1 stating that the voltage is applied between the conductive nano-antennas 180 and the metal layer 120, a voltage may be applied between the active layer 140 and the metal layer 120 in FIG. 6. That is, unlike the description of FIG. 1 stating that the conductive nano-antennas 180 are connected to the ground connection portion 1400, the active layers 140 may be electrically connected to each other such that a uniform electric potential is applied to the active layers 140 by a ground connection portion. Since the electric potential is not applied to the conductive nano-antennas 180, the conductive nano-antennas 180 are electrically disconnected from each other. However, the present disclosure is not limited thereto. The conductive nano-antennas 180 may be connected to each other.

In order to apply the voltage between the active layer 140 and the metal layer 120, the phase modulating element 101 further includes the second insulating layer 170 between the active layer 140 and the metal layer 120. When the voltage is applied between the active layer 140 and the metal layer 120, the carrier-variable region 145 is formed in a location of the active layer 140 which is close to the second insulating layer 170, that is, a location close to a boundary between the active layer 140 and the second insulating layer 170. According to a carrier concentration change of the carrier-variable region 145, an optical capability of the active layer 140 may be adjusted. Also, since phase variations of the phase modulating elements 101 that are two-dimensionally arranged may be adjusted by the pixel circuit units PU respectively connected to the phase modulating elements 101, a desired phase profile may be implemented.

The above-described 2D light modulating devices 1000 and 1001 have the meta surfaces by using the conductive nano-antennas 180, but the meta surfaces may be formed by using dielectric nano-antennas. This will be described below.

Figure 8:
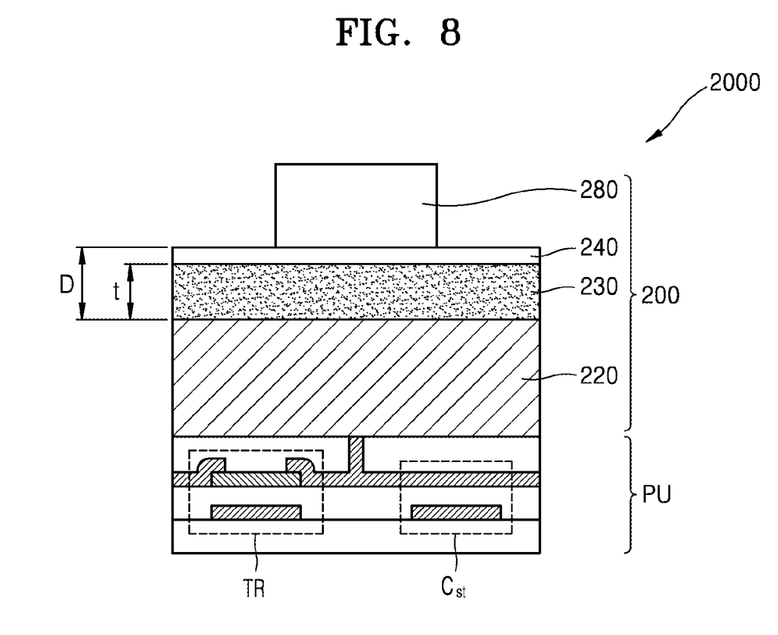
FIG. 8 is a cross-sectional view illustrating a unit structure of a 2D light modulating device according to an exemplary embodiment.

FIG. 8 is a cross-sectional view illustrating a unit structure of a 2D light modulating device 2000 according to an exemplary embodiment.

The 2D light modulating device 2000 includes the pixel circuit unit PU and a phase modulating element 200 on the pixel circuit unit PU.

The phase modulating element 200 includes a dielectric nano-antenna 280, a metal layer 220 that is separated from the dielectric nano-antenna 280 and electrically connected to the pixel circuit unit PU, an active layer 230 disposed on the metal layer 220 and having a refractive index that varies according to electrical signals from the pixel circuit unit PU, and a transparent conductive layer 240 on the active layer 230.

The dielectric nano-antenna 280 may have high antenna efficiency by using Mie resonance occurring by a displacement current. To this end, the dielectric nano-antenna 280 may have one or more subwavelength dimensions and high permittivity (e.g., permittivity greater than that of the active layer 230).

Subwavelength describes a dimension that is smaller than a wavelength of light to be modulated by the 2D light modulating device 2000. At least one of dimensions that define the shape of the dielectric nano-antenna 280 may be subwavelength. For example, when a wavelength of light to be modulated by the 2D light modulating device 2000 is $\lambda$, the subwavelength dimension may be less than or equal to $\lambda/2$.

The dielectric nano-antenna 280 may have the above-described shapes of the conductive nano-antenna 180 or a combination thereof. That is, the dielectric nano-antenna 280 may have a cylindrical shape, a polyprism shape, a polyhedral shape, a cross shape, a star shape, or a combination thereof.

The dielectric nano-antenna 280 may have a refractive index greater than that of the active layer 230. The dielectric nano-antenna 280 may have a refractive index that is greater than a greatest refractive index within a range in which the refractive index of the active layer 230 changes according to an electrical signal. A dielectric constant of the dielectric nano-antenna 280 may be, for example, equal to or greater than 10.

The active layer 230 may include a material having optical properties that change according to an external signal. The external signal may be an electrical signal. The active layer 230 may include an electro-optic material having a refractive index that changes due to a change of effective permittivity when the electrical signal is transmitted. The electro-optic material may be, for example, $LiNbO_3$, $LiTaO_3$, KTN, PZT, or the like and may also be various polymer materials having electro-optic properties.

The transparent conductive layer 240 and the metal layer 220 are on and below the active layer 230, respectively, and are layers to which a voltage for forming an electric field in the active layer 230 is applied.

The metal layer 220 may function as an electrode for applying a voltage as well as a reflective layer that reflects light. The metal layer 220 may include at least one selected from among Cu, Al, Ni, Fe, Co, Zn, Ti, Ru, Rh, Pd, Pt, Ag, Os, Ir, and Au.

The transparent conductive layer 240 may include TCO such as ITO, IZO, AZO, or GZO.

A thickness t of the active layer 230 may be determined to make a distance D from the dielectric nano-antenna 280 to the metal layer 220 satisfy a certain condition. The distance D may be, for example, an integer multiple of $\lambda/4$ when a wavelength to be modulated is $\lambda$.

The pixel circuit unit PU includes the transistor TR and the capacitor $C_{st}$. A drain electrode of the transistor TR and an electrode of the capacitor $C_{st}$ form connection electrodes connected to each other, and the connection electrodes may be electrically connected to the metal layer 220 of the phase modulating element 200 through a conductive through hole.

FIG. 8 shows only one phase modulating element 200 of the 2D light modulating device 2000 for convenience. When multiple phase modulating elements 200 are arranged, the transparent conductive layers 240 of the phase modulating elements 200 may be connected to one another, and the metal layers 220 thereof may be apart from one another. The transparent conductive layers 240 of the phase modulating elements 200 may be connected to one another, and a uniform electric potential may be applied thereto. For example, the transparent conductive layers 240 may be connected to the same ground connection portion.

The pixel circuit unit PU may include a gate line and a data line, and the gate line and the data line may be connected to a gate controller and a pixel charge controller, respectively. The pixel circuit units PU may be arranged as shown in FIG. 2.

When a gate voltage applied as a gate signal from the gate controller reaches the gate electrode GE of the transistor TR, a channel is formed between the source electrode and the drain electrode of the transistor TR. When a charge signal from the pixel charge controller reaches the capacitor $C_{st}$ through the channel, the capacitor $C_{st}$ is charged. The gate controller and the pixel charge controller may respectively transmit the gate signal and the charge signal in such a manner that different charges are charged to the capacitor $C_{st}$ in each pixel circuit unit PU. The charges may produce a desired phase profile in the entire 2D light modulating device 2000 as phase modulation is differently performed by the phase modulating elements 200 and thus generate desired modulated light.

Figure 9:
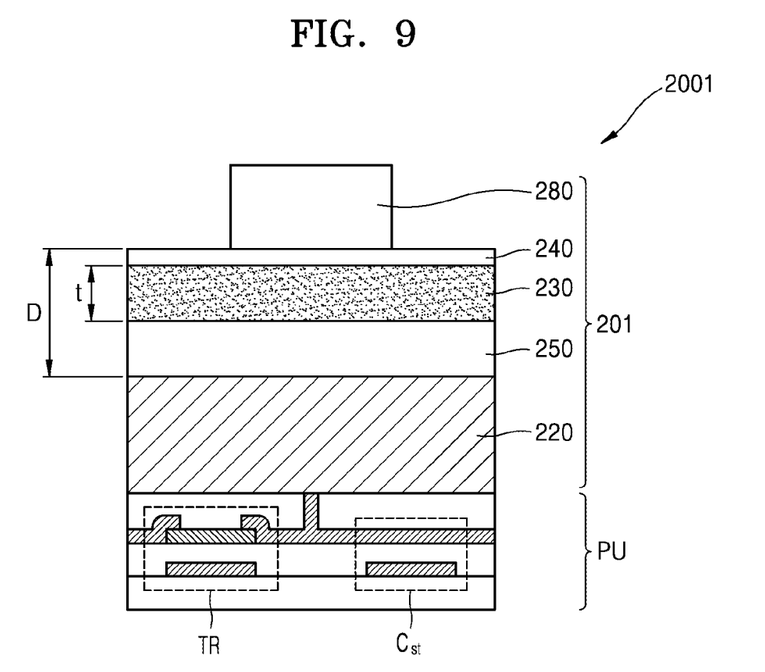
FIG. 9 is a cross-sectional view illustrating a unit structure of a 2D light modulating device according to an exemplary embodiment.

FIG. 9 is a cross-sectional view illustrating a unit structure of a 2D light modulating device 2001 according to an exemplary embodiment.

The 2D light modulating device 2001 includes the pixel circuit unit PU and a phase modulating element 201 electrically connected to the pixel circuit unit PU.

The phase modulating element 201 is different from the phase modulating element 200 of FIG. 8, in terms of that the phase modulating element 201 further includes a spacer layer 250.

The spacer layer 250 may be between the metal layer 220 and the active layer 230, include a dielectric material, and have a refractive index smaller than that of the dielectric nano-antenna 280. However, the present disclosure is not limited thereto. The spacer layer 250 is disposed to match the distance D between the dielectric nano-antenna 280 and the metal layer 220 with a desired value. For example, when a requirement for the thickness t of the active layer 230 and a requirement for the distance D between the dielectric nano-antenna 280 and the metal layer 220 are difficult to satisfy a resonance property of the dielectric nano-antenna 280 at the same time, the spacer layer 250 having the refractive index smaller than that of the dielectric nano-antenna 280 may be inserted at an appropriate thickness between the metal layer 220 and the active layer 230 such that a desired resonance property may be achieved.

Figure 10:
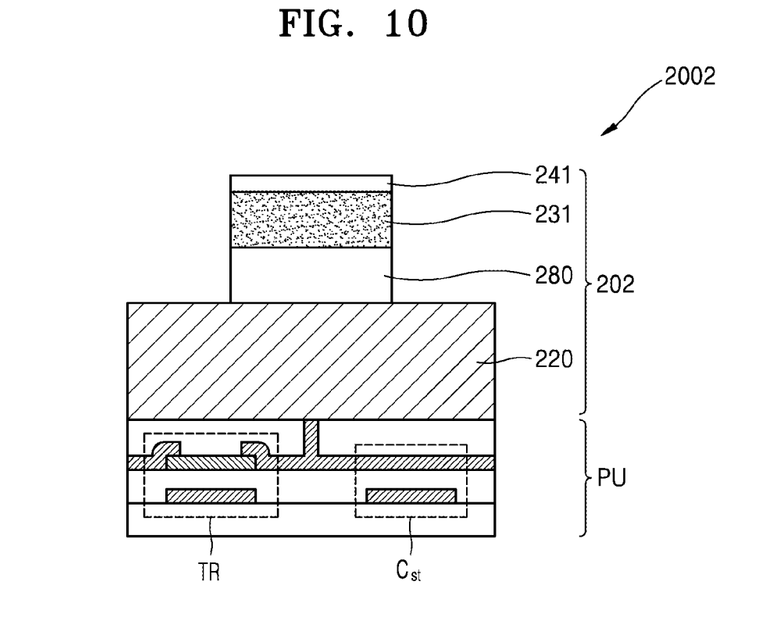
FIG. 10 is a cross-sectional view illustrating a unit structure of a 2D light modulating device according to an exemplary embodiment.

FIG. 10 is a cross-sectional view illustrating a unit structure of a 2D light modulating device 2002 according to an exemplary embodiment.

The 2D light modulating device 2002 includes the pixel circuit unit PU and a phase modulating element 202 electrically connected to the pixel circuit unit PU.

The phase modulating element 202 is different from the phase modulating element 200 included in the 2D light modulating device 2000 of FIG. 8 in terms of an order in which the dielectric nano-antenna 280, an active layer 231, and a transparent conductive layer 241 are arranged above the metal layer 220.

Above the metal layer 220, the dielectric nano-antenna 280, the active layer 231, and the transparent conductive layer 241 may be sequentially arranged. From top views, that is, plan views, shapes of the active layer 231 and the transparent conductive layer 241 may be the same as the shape of the dielectric nano-antenna 280.

A uniform electric potential may be applied to the transparent conductive layers 241 of the phase modulating elements 202, and the transparent conductive layers 241 may be connected to a ground connection portion in a way similar to the conductive nano-antenna 180 of FIG. 1.

Figure 11:
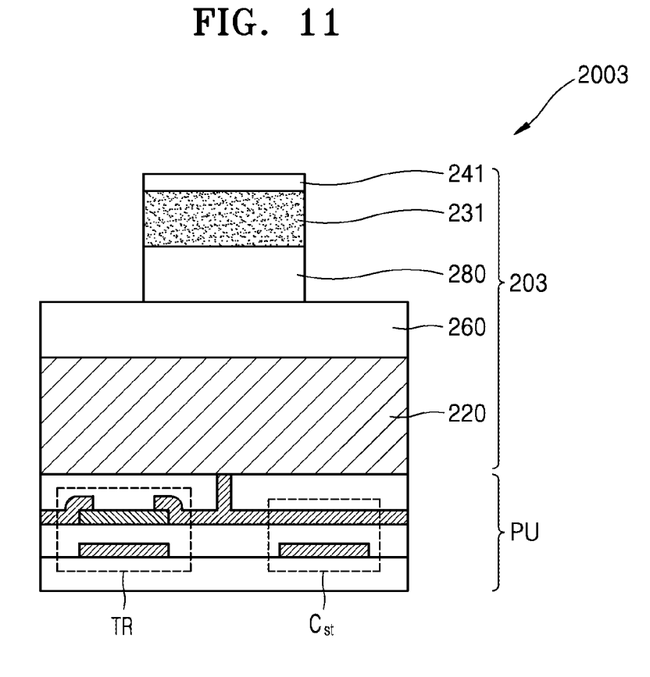
FIG. 11 is a cross-sectional view illustrating a unit structure of a 2D light modulating device according to an exemplary embodiment.

FIG. 11 is a cross-sectional view illustrating a unit structure of a 2D light modulating device 2003 according to an exemplary embodiment.

The 2D light modulating device 2003 includes the pixel circuit unit PU and a phase modulating element 203 electrically connected to the pixel circuit unit PU.

The phase modulating element 203 is different from the phase modulating element 202 of FIG. 10, in that the phase modulating element 203 further includes a spacer layer 260.

The spacer layer 260 may be between the metal layer 220 and the dielectric nano-antenna 280. The spacer layer 260 may include a dielectric material and may have a refractive index smaller than that of the dielectric nano-antenna 280. As described with reference to FIG. 9, the spacer layer 260 may be disposed to satisfy the distance D between the dielectric nano-antenna 280 and the metal layer 220 with a desired value.

In the 2D light modulating devices 1000, 1001, 2000, 2001, 2002, and 2003, phase modulating elements may be arranged to be respectively connected to pixel circuit units that are two-dimensionally arranged, and various phase profiles may be formed because phase variations of the phase modulating elements may be independently set.

The 2D light modulating devices 1000, 1001, 2000, 2001, 2002, and 2003 may be used as, for example, beam steering devices capable of two-dimensionally controlling a steering direction of incident light. Furthermore, since the 2D light modulating devices 1000, 1001, 2000, 2001, 2002, and 2003 may be used as beam splitters for splitting incident light in various directions, beam shapers for forming beam shapes, optical apparatuses having refractive indices, or the like, the 2D light modulating devices 1000, 1001, 2000, 2001, 2002, and 2003 may be employed in various electronic devices.

Figure 12:
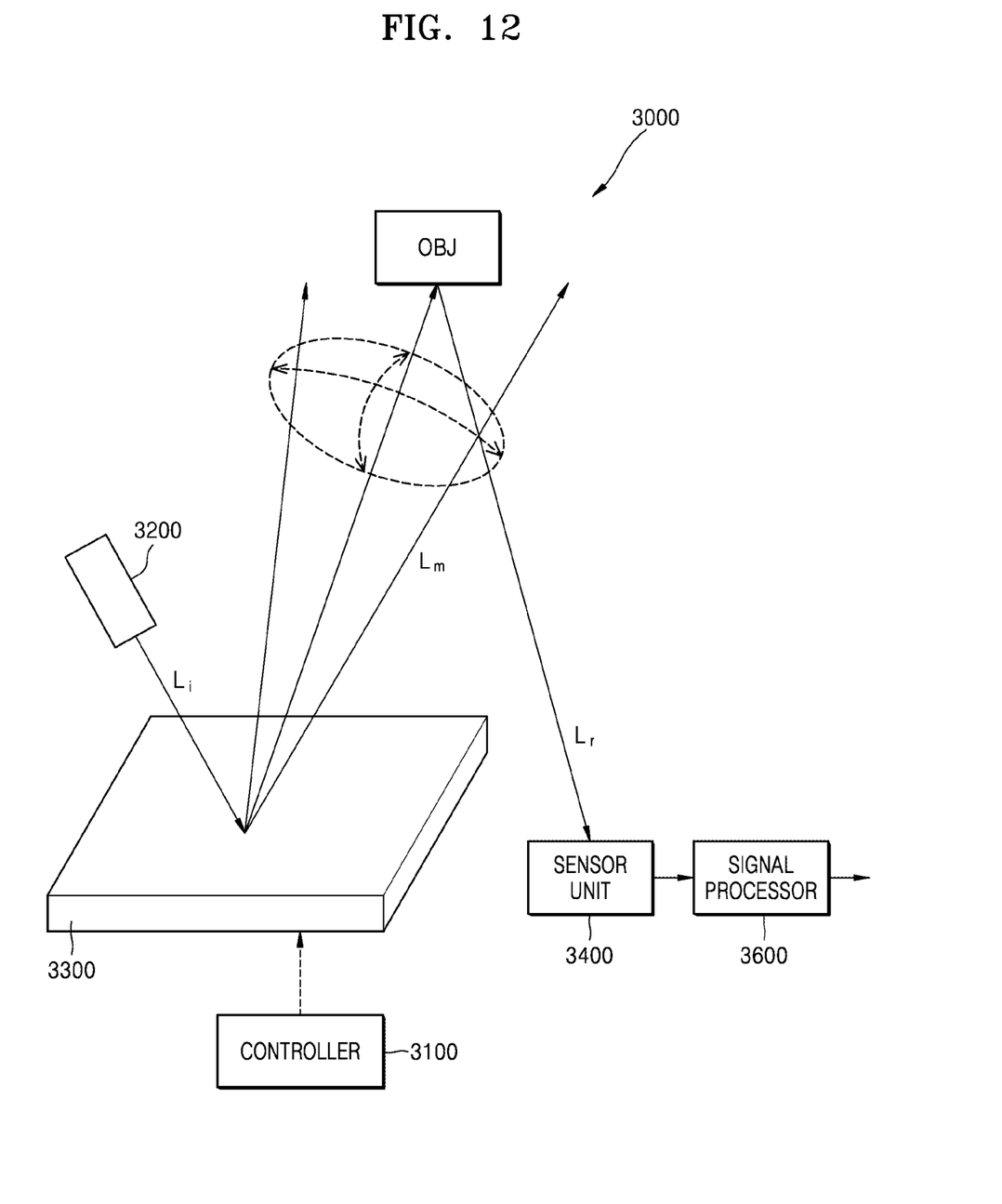
FIG. 12 is a block diagram illustrating a schematic structure of a lidar device according to an exemplary embodiment.

FIG. 12 is a block diagram illustrating a schematic structure of a lidar device 3000 according to an embodiment.

The lidar device 3000 may include a light source unit 3200 that irradiates light, a 2D light modulating device 3300 that steers the light irradiated from the light source unit 3200 toward an object OBJ, and a sensor unit 3400 that senses light reflected from the object OBJ.

The lidar device 3000 may further include a controller 3100 that controls a phase profile in the 2D light modulating device 3300 and a signal processor 3600 for processing signals sensed by the sensor unit 3400.

The light source unit 3200 irradiates light to be used for analyzing a location and a shape of the object OBJ. The light source unit 3200 may include a light source for generating and irradiating light having a certain wavelength. The light source unit 3200 may include a light source such as a laser diode (LD), a light emitting diode (LED), a super luminescent diode (SLD), or the like, which generates and irradiates light in a wavelength band suitable for the analysis of the location and the shape of the object OBJ (e.g., light having an infrared wavelength). The light source unit 3200 may generate and irradiate light in different wavelength bands. The light source unit 1200 may generate and irradiate pulse light or continuous light.

The 2D light modulating device 3300 may include phase modulating elements for independently modulating a phase of incident light $L_i$, and pixel circuit units that are two-dimensionally arranged to individually control the phase modulating elements. The 2D light modulating device 3300 may have a structure or a modified structure of any one of the 2D light modulating devices 1000, 1001, 2000, 2001, 2002, and 2003.

Between the light source unit 3200 and the 2D light modulating device 3300 and/or between the 2D light modulating device 3300 and the object OBJ, other optical members, for example, members for adjusting a path of light irradiated from the light source unit 3200, splitting a wavelength of the irradiated light, or performing additional modulation, may be further disposed.

The controller 3100 may control input signals that are input to the phase modulating elements included in the 2D light modulating device 3300 such that the 2D light modulating device 3300 may have a phase profile that performs a beam steering function. The controller 3100 may also control a gate controller and a pixel charge controller of the 2D light modulating device 3300 to time-sequentially adjust the steering direction of the 2D light modulating device 3300 and scan the object OBJ. The 2D light modulating device 3300 may perform beam steering in a 2D direction and thus may scan the object OBJ along the 2D direction. While the object OBJ is being scanned, reflected light $L_r$ that is reflected from the object OBJ is sensed by the sensor unit 3400. A sensed optical signal may be transmitted to the signal processor 3600 and used for the analysis of existence, a location, a shape, etc. of the object OBJ.

The sensor unit 3400 may include an array of sensors for optical detection that senses light reflected from the object OBJ. The sensor unit 3400 may also include arrays of sensors capable of sensing light having different wavelengths.

The signal processor 3600 may perform a certain operation (e.g., an operation for measuring a time of flight) based on an optical signal detected by the sensor unit 3400 and three-dimensional (3D) shape identification of the object OBJ based on the above operation. The signal processor 3600 may use various operation methods. For example, according to a direct time measurement method, pulse light is irradiated onto the object OBJ, and a time of arrival of the light after being reflected from the object OBJ is measured by a timer, thereby calculating a distance. According to a correlation method, the pulse light is irradiated onto the object OBJ, and a distance is measured based on brightness of the light reflected from the object OBJ. According to a phase delay measurement method, light having a continuous wave such as a sine wave is irradiated onto the object OBJ, a phase difference of the light reflected from the object OBJ is detected, and thus the phase difference is converted into the distance. The signal processor 3600 may include a memory in which a program necessary for the operation and data are stored.

The signal processor 3600 may transmit an operation result, that is, information about the shape and location of the object OBJ, to another unit. For example, the information may be transmitted to a driving controller, an alert system, etc., of a self-driving device (e.g., an autonomous vehicle) employing the lidar device 3000.

The lidar device 3000 may be used as a sensor for obtaining 3D information about a distant object in real time, thus being applicable to a self-driving device (e.g., an unmanned vehicle, a self-driving vehicle, a robot, a drone, etc.). The lidar device 3000 may also be applied to a black box (e.g., a dashboard camera and/or recorder) or the like as well as the self-driving device, so as to identify front or rear obstacles in the night when objects are difficult to identify with an image sensor alone.

In the above-described 2D light modulating device, pixel circuit units that are two-dimensionally arranged and phase modulating elements respectively connected to the pixel circuit units are arranged, and thus various phase profiles may be produced.

The above-described 2D light modulating device may two-dimensionally modulate a shape of incident light and implement various optical capabilities. For example, the 2D light modulating device may perform beam steering in a 2D direction.

The above-described 2D light modulating device may be employed in various electronic devices using the above optical capabilities.

It should be understood that various exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A two-dimensional (2D) light modulating device comprising:
   a plurality of phase modulating elements comprising a meta surface having a nano-structure; and
   a circuit board configured to independently control electrical signals that are respectively transmitted to the plurality of phase modulating elements, and comprising a plurality of pixel circuit units, wherein each of the plurality of pixel circuit units comprises a transistor and a capacitor,
   wherein each of the plurality of phase modulating elements comprises:
      a metal layer that is electrically connected to a corresponding pixel circuit unit among the plurality of pixel circuit units;
      an active layer disposed on the metal layer, the active layer having a refractive index that changes based on an electrical signal transmitted from the corresponding pixel circuit unit;
      a conductive nano-antenna disposed on the active layer;
      a first insulating layer disposed between the active layer and the conductive nano-antenna; and
      a second insulating layer disposed between the metal layer and the active layer.

2. The 2D light modulating device of claim 1, wherein the active layer comprises a carrier-variable region where a concentration of carriers changes based on an applied voltage.

3. The 2D light modulating device of claim 2, wherein the carrier variable region in the active layer is adjacent to the first insulating layer.

4. The 2D light modulating device of claim 1, wherein the active layer comprises at least one of transparent conductive oxide, transition metal nitride, lithium niobate ($LiNbO_3$), lithium tantalate ($LiTaO_3$), potassium tantalate niobate (KTN), lead zirconate titanate (PZT), and a polymer material having an electro-optic property.

5. The 2D light modulating device of claim 1, wherein at least some of conductive nano-antennas of the plurality of phase modulating elements are electrically connected to each other, and
   wherein a uniform electric potential is applied to the at least some of the conductive nano-antennas.

6. The 2D light modulating device of claim 1, wherein active layers of the plurality of phase modulating elements are electrically connected to each other, and
   wherein a uniform electric potential is applied to the active layers.

7. The 2D light modulating device of claim 1, wherein the active layer comprises a carrier-variable region where a concentration of carriers changes based on an applied voltage, and
   wherein the carrier variable region in the active layer is adjacent to the second insulating layer.

8. A two-dimensional (2D) light modulating device comprising:
   a plurality of phase modulating elements comprising a meta surface having a nano-structure; and
   a circuit board configured to independently control electrical signals that are respectively transmitted to the plurality of phase modulating elements, and comprising a plurality of pixel circuit units, wherein each of the plurality of pixel circuit units comprises a transistor and a capacitor, wherein each of the plurality of phase modulating elements comprises:
a dielectric nano-antenna;
a metal layer that is separated from the dielectric nano-antenna and electrically connected to a corresponding pixel circuit unit among the plurality of pixel circuit units;
an active layer disposed above the metal layer, the active layer having a refractive index that changes based on an electrical signal from the corresponding pixel circuit unit; and
a transparent conductive layer disposed on the active layer.

9. The 2D light modulating device of claim 8, wherein the refractive index of the active layer is less than a refractive index of the dielectric nano-antenna.

10. The 2D light modulating device of claim 9, wherein the dielectric nano-antenna comprises a material having a dielectric constant that is equal to or greater than 10.

11. The 2D light modulating device of claim 8, wherein transparent conductive layers of the plurality of phase modulating elements are electrically connected to each other, and
wherein a uniform electric potential is applied to the transparent conductive layers.

12. The 2D light modulating device of claim 8, wherein the active layer, the transparent conductive layer, and the dielectric nano-antenna are sequentially arranged above the metal layer.

13. The 2D light modulating device of claim 12, further comprising a spacer layer between the metal layer and the active layer, the spacer layer comprising a dielectric material.

14. The 2D light modulating device of claim 8, wherein the dielectric nano-antenna, the active layer, and the transparent conductive layer are sequentially arranged above the metal layer.

15. The 2D light modulating device of claim 14, wherein the active layer and the transparent conductive layer have a same shape as the dielectric nano-antenna when viewed from a plan view.

16. The 2D light modulating device of claim 14, further comprising a spacer layer between the metal layer and the dielectric nano-antenna, the spacer layer comprising a dielectric material.

17. The 2D light modulating device of claim 1, wherein the nano-structure has one of a circular shape, an oval shape, a polygonal shape, a cross shape, a star shape, and a shape in which two or more of the circular shape, the oval shape, the polygonal shape, the cross shape, and the star shape are combined.

18. A lidar device comprising:
a light source unit;
a two-dimensional (2D) light modulating device configured to steer light irradiated from the light source unit toward an object, the two-dimensional light modulating device comprising:
a plurality of phase modulating elements comprising a meta surface having a nano-structure, and
a circuit board independently controlling electrical signals that are respectively transmitted to the plurality of phase modulating elements, the circuit board comprising a plurality of pixel circuit units, and each of the plurality of pixel circuit units comprising a transistor and a capacitor,
wherein each of the plurality of phase modulating elements comprises:
a metal layer that is electrically connected to a corresponding pixel circuit unit among the plurality of pixel circuit units;
an active layer disposed on the metal layer, the active layer having a refractive index that changes based on an electrical signal transmitted from the corresponding pixel circuit unit;
a conductive nano-antenna disposed on the active layer;
a first insulating layer disposed between the active layer and the conductive nano-antenna; and
a second insulating layer disposed between the metal layer and the active layer; and
a sensor configured to receive the light that is steered by the 2D light modulating device, irradiated onto the object, and is reflected from the object.

19. A light modulating device comprising:
a circuit board comprising a pixel circuit unit configured to generate a control signal; and
a phase modulating element disposed on the pixel circuit unit and being configured to receive the control signal from the pixel circuit unit and modulate at least one of a phase, a direction, and a shape of incident light,
wherein the phase modulating element comprises:
a dielectric nano-antenna;
a metal layer that is separated from the dielectric nano-antenna and electrically connected to the pixel circuit unit;
an active layer disposed above the metal layer, the active layer having a refractive index that changes based on an electrical signal from the pixel circuit unit and
a transparent conductive layer disposed on the active layer
wherein a structure of the dielectric nano-antenna has at least one dimension that is smaller than a wavelength of the incident light.

* * * * *